United States Patent [19]

Giller et al.

[11] Patent Number: 4,465,807

[45] Date of Patent: Aug. 14, 1984

[54] PROCESS FOR THE PREPARATION OF REINFORCED RUBBER VULCANIZATES AND USE THEREOF

[75] Inventors: Arnold Giller, Taunusstein; Joachim Weil, Wiesbaden, both of Fed. Rep. of Germany

[73] Assignee: Hoechst Aktiengesellschaft, Fed. Rep. of Germany

[21] Appl. No.: 527,740

[22] Filed: Aug. 30, 1983

Related U.S. Application Data

[63] Continuation of Ser. No. 269,477, Jun. 2, 1981, abandoned, which is a continuation of Ser. No. 098,765, Nov. 30, 1979, abandoned.

[30] Foreign Application Priority Data

Dec. 4, 1978 [DE] Fed. Rep. of Germany ....... 2852311

[51] Int. Cl.$^3$ .......................... C08L 61/10; C08L 9/06
[52] U.S. Cl. .................................... 525/135; 260/784; 156/110.1; 525/134; 525/137; 525/139; 152/330 R; 524/306; 524/311; 524/321; 524/322
[58] Field of Search ............... 525/132, 134, 135, 137, 525/139, 497; 260/784; 156/110 R; 152/330 R

[56] References Cited

U.S. PATENT DOCUMENTS

| | | | |
|---|---|---|---|
| 2,916,471 | 12/1959 | Rosahl et al. | 525/139 |
| 3,250,733 | 5/1966 | Giller | 525/139 |
| 3,277,209 | 10/1966 | Giller et al. | 525/139 |
| 3,287,440 | 11/1966 | Giller | 525/139 |
| 3,638,702 | 2/1972 | Endter | 152/330 |
| 3,963,652 | 6/1976 | Tanimura et al. | 260/3 |

Primary Examiner—Theodore E. Pertilla
Attorney, Agent, or Firm—Charles A. Muserlian

[57] ABSTRACT

A process for the preparation of reinforced vulcanizates which process comprises vulcanizing a mixture comprising rubber, a novolak and at least one reactive melamine resin obtained by reaction of one mol of melamine with 0.5 to 6 mols of aldehyde, said melamine resin being present in an amount of from 0.5 to 120% by weight, based on the weight of the novolak resin, and the phenolic component of said novolak resin being selected from the group consisting of phenol, polynuclear polyphenols, alkylphenols, a combination of alkylphenols with phenol, and a combination of at least one of said phenols with a further phenol selected from the group consisting of resorcinol, phenylphenol and polyalkylphenols. The invention also includes rubber articles prepared from a product of such a process.

10 Claims, No Drawings

PROCESS FOR THE PREPARATION OF REINFORCED RUBBER VULCANIZATES AND USE THEREOF

PRIOR APPLICATION

This application is a continuation of copending U.S. patent application Ser. No. 269,477 filed June 2, 1981 which in turn is a continuation of U.S. patent application Ser. No. 098,765 filed Nov. 30, 1979, both now abandoned.

It is known to prepare light rubber grades from natural or synthetic rubber by vulcanization with sulphur with the addition of at least 0.5% (relative to the weight of the rubber) of a curable etherified condensation product of aldehydes and urea and/or melamine or derivatives thereof. The melamine resins used for reinforcement may be employed as solid powdered condensation products.

It is also known to prepare hard rubber vulcanizates by the vulcanization of rubber mixtures with sulphur with the addition of hexamethoxymethylmelamine or resins obtained from melamine or guanamines and aldehydes the alkylol groups of which resins have been etherified by alcohols. The hardening effect obtained in the lastmentioned process may be intensified by the addition of polyester resins formed from dicarboxylic acids and polyhydric alcohols and having an acid number of at least 50.

According to a further publication it is known that mixtures of natural or synthetic rubber may be reinforced by the addition of novolaks and resols in a ratio of 9:1 to 1:9.

The above-mentioned processes can be carried out according to the specifications mentioned and produce the effects cited therein, but they have assumed only limited significance economically.

However, the reinforcement of rubber grades of the most diverse types by the addition of phenol novolaks and hexamethylene tetramine as curing agent is of practical importance. The reinforcing effect of the resins used may if desired be effectively controlled by the quantity of curing agent employed.

Although this method of reinforcing rubber using a novolak resin and hexamethylenetetramine is successful in practice, it has recently been criticised on the grounds of environmental safety, since hexamethylenetetramine irritates the human skin and is said to give rise to rashes.

It has surprisingly been found that a large variety of novolaks suitable for the reinforcement of rubber may be cured by the addition of reactive melamine resins, and in this way especially efficient reinforcing effects may be achieved. The invention is therefore concerned with a process for the preparation of reinforced vulcanizates by the vulcanization of natural or synthetic rubber mixtures with novolak resins in the presence of an amine compound as curing agent, which is characterised in that the vulcanization is effected in the presence of, as curing agents, reactive melamine resins obtained by reacting melamine with 0.5 to 6 moles of aldehyde, in a proportion of 0.5 to 120, preferably 2 to 50% by weight, relative to novolak resin, and in that the phenolic component of the novolak is selected from the group phenol, polyhydric polynuclear phenols, alkyl phenols, mixtures of alkyl phenols with phenol, or a combination of at least one of said phenols with a further phenol selected from the group resorcinol, phenylphenol or polyalkyl phenols. In the latter case the further phenols may be employed in such a quantity that the molar ratio of the total quantity of the further phenols to the total quantity of the other phenols is up to 1:1, advantageously not more than 1:2.

The methylol groups present in the melamine resin may be free or at least partly etherified by reaction with monohydric alcohols with 1 to 12 carbon atoms.

Melamine resins alone, used according to the above-mentioned known processes, have a distinctly weaker effect than the conventionally used novolak/hexamethylene tetramine systems in rubber mixtures of various types. When solid reactive melamine resins are employed in such processes, their effect depends largely on the fineness of the particles thereof. In practice, the particle size of active fillers is achieved only in exceptional cases.

Solid melamine resins may also optionally be used in the process according to the invention. As a rule, a malamine resin with a particle size of at most 100 μm, preferably about 50 μm will be used. Highly reactive melamine resins can be prepared in solution relatively easily. Resins of this type are suitable for working into rubbers only to a limited degree, since the required solvents such as higher alcohols, water, polyglycols or esters are not compatible with most rubber types. They have to be evaporated during the mixing process. Although hexamethoxymethylmelamine itself is easy to work in, it cures only slowly. For this reason, it does not have the effect of the phenol novolak/hexamethylene tetramine mixtures used in practice.

Hexamethoxymethylmelamine alone reacts with itself only very slowly upon heating. If a reaction is to take place at room temperature, the use of this substance necessitates the addition of strong acids, e.g. hydrochloric acid or toluenesulphonic acid. For this reason, it is surprising that in the process according to the invention the rubber mixtures to which phenol novolaks of the most diverse types have been added for reinforcement are cured very efficiently by melamine resins of the above-described type, especially hexamethoxymethylmelamine or the corresponding higher polynuclear condensation products of monomeric melamine resins. A reinforcing effect many time more intense even than that obtained with novolak/hexamethylene tetramine mixtures can be achieved. The reinforcing effects achieved with the process according to the invention are particularly well illustrated by the increase in the stress values at 100, 200 and 300% extension as well as by the increase in the vulcanizate hardness.

In applications of the process according to the invention the speed of cure and the speed of the hardening effect may be substantially accelerated and intensified by the addition of suitable monobasic or dibasic organic acids with at least 2 and at most 20 carbon atoms, such as phthalic, benzoic, maleic, fumaric, trimellitic and pyromellitic acids and anhydrides of such acids, or sulphonic acids such as naphthalenedisulphonic acid or sulphanilic acid.

In addition, polyester resins formed from polycarboxylic acids and polyhydric alcohols with acid numbers of 20 and above, (e.g. up to 100) may be used instead of or together with the organic acids, and such resins may also be modified by monocarboxylic acids and monohydric alcohols. However, the proportion of monohydric components should amount at most to 25 equivalent % relative to the acid or alcohol component.

The organic acids or polyester resins serving to accelerate curing may be added in quantities of 0.1 to about 5, preferably 1.5 to 3% by weight, relative to rubber. Larger or smaller amounts of acid may also be employed.

The acceleration of curing may also be achieved by means of strong inorganic acids such as phosphoric acid or acidic phosphoric esters. However, this method is inconvenient due to the precautionary measures necessary when such acids are used.

The starting mixtures employed according to the invention may be prepared by conventional means in internal mixers or on mixing rolls. It is necessary to ensure when the resins are worked into the rubber that the temperature of the mixture exceeds the melting point of the resins, especially that of the novolak resins, at every stage of the preparation, so that the resins are distributed completely throughout the mixture. Furthermore, it is important that the melamine resins to be used as curing agents are worked into the mixture in such a way the premature self-condensation or a premature reaction with the novolak which is to be cured do not occur.

Thus it is possible for such premature reactions to be avoided if the melamine resins are worked in near the end of the mixing operation at temperatures which are not too high. The appropriate temperature depends on the type of melamine resin used, on the quantity of acid and on the time, and is generally between 80° to 120° C. In certain cases it may be higher, e.g. where hexamethoxymethyl melamine is used in the absence of acid, or it may be lower.

Suitable types of rubber are, for example, natural rubber, styrene rubber, acrylonitrile rubber, polybutadiene, butyl rubber, ethylene/propylene/diene/terpolymer rubber or mixtures thereof, such as are used conventionally in the tire industry or in the manufacture of industrial rubber goods.

Suitable novolak resins are, for example, those obtained from phenol, polyhydric polynuclear phenols such as bisphenols, for example diphenylol propane or diphenylolmethane, or mixtures of phenol and alkyl phenols such as tertiary butyl phenol, octyl phenol or nonyl phenol reacted with aldehydes, preferably formaldehyde under acid conditions. Moreover, the novolak resins may contain softening agents such as polyethylene glycols or tall oil or other suitable plasticising agents. In principle, novolak resins which consist exclusively of alkyl phenols carrying an alkyl group of 1 to 12 carbon atoms may also be used; but these are of only limited use since they are less readily cured. Furthermore, the novolak resins may contain additions of resorcinol or phenylphenol or phenols containing several alkyl groups. For practical use preferred novolak resins are those formed from phenol and mixtures of phenol and cashew-nut shell oil as well as from phenol and alkyl phenols having 4–12 carbon atoms in the alkyl moiety, especially p-tert. butyl-, octyl-or nonylphenol. The proportion of substituted phenols in the novolak may vary, as long as the novolak is still sufficiently curable. Thus, a proportion of alkylphenol of at most 70 molar % of the total phenol component will generally be chosen.

The proportion of novolak relative to the elastomer is, as a rule, 1–30, preferably 3–20% by weight. In certain cases larger quantities e.g. 100% by weight and more relative to the elastomer may be used. With such a high propportion of novolak hard products are obtained which differ substantially in their properties from the conventional high-elasticity rubber vulcanizates.

Preferred melamine resins are hexamethoxymethyl melamine or corresponding more highly condensed polynuclear products or at least partly etherified trimethylol-, tetramethylol- or pentamethylol- melamine resins. The degree of condensation of the aldehyde resins, especially of the formaldehyde resins and their content of free methylol groups may be controlled in a conventional way by corresponding adjustment of the reaction medium. The free methylol groups may be etherified with monohydric alcohols having 1–12, preferably 1–8 carbon atoms, such as methanol, the various isomers of butanol, ethylhexyl alcohol, n-octanol, nonanol and dodecyl alcohol.

The optimum quantities of melamine resins necessary for curing the novolak resins may be determined, in general, in simple preliminary tests. In general, about 1–80, preferably 2–50% by weight of melamine resin is required per 100 parts by weight of novolak resin.

It is also possible to add, instead of or together with the acids, softeners conventional in rubber processing, for example aromatic polyethers, phthalates and the like.

Commercially obtainable active or inactive carbon black, silicic acids, kaolins, chalks or other conventional materials may be used as fillers. As a rule, sulphur, in conjunction with known accelerators, is used for vulcanization. In many cases, however, the processes may be carried out without the use of sulphur. Vulcanization in the presence of sulphur is, nevertheless, preferred. The course of vulcanization may be adapted to practical requirements by a choice of suitable accelerators conventional in rubber technology.

Industrial rubber articles may be manufactured from the mixtures containing a novolak resin and a melamine resin prepared according to the invention. However, they may be used also for the manufacture of motor vehicle tires.

In the following Examples all quantities are expressed in parts by weight unless otherwise stated.

EXAMPLES

TABLE 1

| Mixture No. | V1 (Comparison) | V2 (Comparison) | 1 | 2 | 3 | 4 |
|---|---|---|---|---|---|---|
| Styrene-butadiene rubber[1] | 100 | 100 | 100 | 100 | 100 | 100 |
| Carbon black N-330[2] | 50 | 50 | 50 | 50 | 50 | 50 |
| Stearic acid | 1.5 | 1.5 | 1.5 | 1.5 | — | — |
| ZnO | 5 | 5 | 5 | 5 | 5 | 5 |
| Age-resisting agent | 2 | 2 | 2 | 2 | 2 | 2 |
| Sulphur | — | — | 2 | 2 | 2 | 2 |
| Phenol novolak[3] | — | 18 | 14 | 14 | 14 | 14 |
| Hexamethylene tetramine | — | 2 | — | — | — | — |
| Hexamethoxymethyl | — | — | 6 | 6 | 6 | 6 |

TABLE 1-continued

| Mixture No. | V1 (Comparison) | V2 (Comparison) | 1 | 2 | 3 | 4 |
|---|---|---|---|---|---|---|
| melamine[4] | | | | | | |
| Benzoic acid | — | — | — | 3 | — | — |
| Diethylene glycol | — | — | — | — | 3 | — |
| Acid phthalic acid/pentaerythritol/polyester resin | — | — | — | — | — | 3 |
| Sulphenamide accelerator | 1.2 | 1.2 | 1.2 | 1.2 | 1.25 | 1.25 |
| Tetramethyl thiuram monosulphide | 0.2 | 0.2 | 0.2 | 0.2 | — | — |
| Zinc-N—diethyl dithiocarbamate | — | — | — | — | 0.25 | 0.25 |
| Vulcanisation 150° C. 20 minutes | | | | | | |
| Tearing strength (MPa) | 25.6 | 22.2 | 25.0 | 22.5 | 21.9 | 23.4 |
| Elongation at break (%) | 315 | 314 | 357 | 360 | 303 | 341 |
| Stress value at 100% extension (MPa) | 5.3 | 6.6 | 7.0 | 8.5 | 7.2 | 6.6 |
| Stress value at 200% extension (MPa) | 14.4 | 14.7 | 14.0 | 15.8 | 14.7 | 13.8 |
| Stress value at 300% extension (MPa) | 24.1 | 21.6 | 21.3 | 23.0 | 21.3 | 21.3 |
| Shore Hardness (Shore A) | 71 | 84 | 88 | 90 | 86 | 87 |

Footnotes
[1] Styrene-butadiene rubber containing resin fatty acid with 23.5% bound styrene.
[2] Carbon black for high abrasion resistance. A rubber/carbon black master batch of 100 parts by weight of rubber and 50 parts by weight of carbon black was used.
[3] Commercial phenol novolak, m.p. 83–88° C. (capillary method).
[4] Viscosity as supplied: 8–22 Pa.s at 20° C.

DISCUSSION OF THE RESULTS OF TABLE 1

Mixtures V 1 and V 2 are comparison mixtures. Mixture V 2 shows the reinforcement of a styrene-/butadiene/carbon black mixture with a commercial phenols novolak upon hardening with hexamethylenetetramine. Mixture 1 shows the reinforcing effect according to the invention upon the use of a commercial hexamethoxymelamine grade free of water and solvent and adjusted for high viscosity. Mixture 2 shows the effect of benzoic acid used to accelerate the hardening.

The vulcanisates of mixture V 2 differ from those of mixture V 1 in having a rather higher stress value at 100% and a clearly higher vulcanisate hardness. Mixture 1 prepared according to the invention gives vulcanisates with a further increased stress value at 100% extension and much higher hardness. With the use of benzoic acid the stress values at 100, 200 and 300% extension and the vulcanisate hardness are also increased.

If a material of lower viscosity (4,000–8,000 mPa.s) is used instead of the high-viscosity hexamethoxymethylmelamine, vulcanisate hardnesses above 90° Shore A can be obtained.

If 6 parts by weight of a powdered melamine resin obtained by reacting 1 mole of melamine with about 1.2 moles of formaldehyde are used instead of the 6 parts by weight of hexamethoxymethylmelamine, then vulcanisates are obtained which largely correspond in their test data to the vulcanisates of mixture 1.

Mixtures 3 and 4 prepared according to the invention show that plasticising additives such as diethylene glycol or an acidic phthalic acid/pentaerythritol/polyester resin may be used with advantage. Due to the diethylene glycol the Mooney viscosity is reduced by about 10 to 15 units in relation to a comparison mixture. The polyester resin added to mixture 4 (which has an acid number of about 200) assists curing.

TABLE 2

| Mixture No. | V5 | 6 | 7 | 8 | 9 | 10 | 11 |
|---|---|---|---|---|---|---|---|
| Styrene-butadiene rubber | 100 | 100 | 100 | 100 | 100 | 100 | 100 |
| Carbon Black N-330 | 50 | 50 | 50 | 50 | 50 | 50 | 50 |
| Stearic acid | 1.5 | 1.5 | 1.5 | 1.5 | 1.5 | 1.5 | 1.5 |
| ZnO | 5 | 5 | 5 | 5 | 5 | 5 | 5 |
| Age-resisting agent | 2 | 2 | 2 | 2 | 2 | 2 | 2 |
| Sulphur | 2 | 2 | 2 | 2 | 2 | 2 | 2 |
| N—cyclohexyl-2-benzothiazole sulphenamide | 1 | 1 | 1 | 1 | 1 | 1 | 1 |
| Tetramethyl thiuram monosulphide | 0.2 | 0.2 | 0.2 | 0.2 | 0.2 | 0.2 | 0.2 |
| Dithiodimorpholine | — | — | — | — | — | 2.5 | — |
| Phenol novolak[1] | — | 14 | 14 | 15 | 14 | 14 | 14 |
| Trimethylol melamine | — | 6 | 6 | — | — | — | — |
| Pentamethylol melamine resin[2] | — | — | — | 5 | — | — | — |
| Pentamethylolmelamine trimethyl ether | — | — | — | — | 6 | 6 | — |
| Tetrabutoxydimethoxymethyl melamine[3] | — | — | — | — | — | — | 6 |
| Benzoic acid | — | — | 3 | 1.5 | — | — | — |
| Phthalic acid | — | — | — | — | 3 | 3 | 2 |
| Vulcanisation 145° C. (in a press) min. | 60 | 60 | 60 | 60 | 30 | 30 | 30 |

TABLE 2-continued

| Mixture No. | V5 | 6 | 7 | 8 | 9 | 10 | 11 |
|---|---|---|---|---|---|---|---|
| Tearing strength (mPa) | 19.4 | 20.6 | 19.4 | 22.2 | 20.3 | 19 | 18.8 |
| Elongation at break (%) | 276 | 286 | 266 | 275 | 262 | 245 | 256 |
| Stress value 100% (mPa) | — | — | — | — | 6.6 | 7.5 | 6.3 |
| Stress value 200% (mPa) | 13.8 | 14.1 | 16.3 | 16.6 | 16.3 | 19.2 | 14.4 |
| Shore Hardness (Shore A) | 72 | 80 | 84 | 82 | 86 | 90 | 87 |
| Notch impact strength (N/mm) | 10 | 9.8 | 10 | 9.9 | — | — | 12.5 |

TABLE 3

| Mixture No. | V12 | 13 | 14 |
|---|---|---|---|
| Phenol-butadiene rubber | 100 | 100 | 100 |
| Carbon Black N-330 | 50 | 50 | 50 |
| Stearic acid | 2 | 2 | 2 |
| ZnO | 4 | 4 | 4 |
| Age-resisting agent | 2 | 2 | 2 |
| Sulphur | 2 | 2 | 2 |
| N—tert.-butyl-2-benzo-thiazol sulphenamide | 1.2 | 1.2 | 1.2 |
| Zinc diethyldithio-carbamate | 0.25 | 0.25 | 0.25 |
| Phenol novolak | — | 14 | 14 |
| Tetramethylol melamine dibutoxy resin[4] | — | 11 | — |
| Pentamethylol melamine trimethyl ether, modified with triethylene glycol | — | — | 8 |
| Vulcanisation 30 min. 150° C. (in a press) | | | |
| Tearing strength (MPa) | 26.3 | 20.3 | 22.5 |
| Elongation at break (%) | 297 | 281 | 270 |
| Stress value 100% (MPa) | 5.6 | 7 | 7.8 |
| Vulcanisate hardness Shore A (°) | 72 | 88 | 87 |

Footnotes:
[1] Commercial novolak, m.p. 106° C. (ring and ball ASTM E 28–67).
[2] Commercial melamine resin, dynamic viscosity (20° C.) 4000–8000 mPa.s, dilutable in water as desired.
[3] Commercial melamine resin, viscosity (20° C.) 900–1800 mPa.s.
[4] Commercial melamine resin, 55% in isobutanol, dynamic viscosity (supplied form) 300–800 mPa.s. The resin was used with the solvent largely excluded.

TABLE 4

| Mixture No. | 15 | 16 |
|---|---|---|
| Styrene-butadiene rubber | 100 | 100 |
| Carbon Black N-330 | 50 | 50 |
| Stearic acid | 1.5 | 1.5 |
| ZnO | 5 | 5 |
| Age-resisting agent | 2.2 | 2.2 |
| Sulphur | 2 | 2 |
| Cyclohexylbenzothiazol-sulphenamide | 1.1 | 1.1 |
| Tetramethylthiuram monosulphide | 0.2 | 0.2 |
| Phenol novolak[5] | 14 | 7 |
| Resorcinol novolak[6] | 1.7 | 7 |
| Hexamethoxymethyl melamine | 6 | 6 |
| Benzoic acid | 2 | 3 |
| Vulcanisation 40 min. 150° C. (in a press) | | |
| Tearing strength (MPa) | 18.8 | 19.1 |
| Elongation at break (%) | 215 | 243 |
| Stress value 200% (MPa) | 17.5 | 15 |
| Hardness (Shore A) (°) | 87 | 87 |

[5] Commercial phenol novolak m.p. 96° C. (ring and ball ASTM E 28–67).
[6] Commercial resorcinol novolak m.p. 65° C. (ring and ball ASTM E 28–67).

The same types of rubber and carbon black were used respectively in Tables 2 to 4 as in Table 1.

DISCUSSION OF THE RESULTS OF TABLES 2 to 4

Mixtures V5 and V12 are comparison mixtures. As shown by the comparison of the hardness and stress values of mixtures 6 to 8 according to the invention in Table 2 with the corresponding values of comparison sample V5, the hardness and stress values have increased in relation to those of the comparison sample. Mixtures 9 to 11 show a greater increase of the hardness and stress which is presumably caused by the combined effect of the two melamine resins.

In Table 3 the mixtures 13 and 14 according to the invention show likewise a clear improvement of the hardness and stress value in relation to comparison sample V12. The higher hardness is presumably attributable to the different accelerator system.

Table 4 indicates for both samples 15 and 16 a reinforced vulcanisate with good stress values and high hardness.

It is not intended that the examples given herein should be construed to limit the invention thereto, but rather they are submitted to illustrate some of the specific embodiments of the invention. Resort may be had to various modifications and variations of the present invention without departing from the spirit of the discovery or the scope of the appended claims.

We claim:

1. A process for the preparation of reinforced vulcanizates which comprises vulcanizing a mixture comprising rubber, sulfur as a vulcanization agent in conjunction with a conventional accelerator and a novolak as a reinforcing material in conjunction with at least one reactive melamine resin obtained by reaction of one mol of melamine with 0.5 to 6 mols of aldehyde, said melamine resin being present in an amount of from 1 to 80% by weight based on the weight of the novolak resin, the novolak resin being present in the final composition in an amount of from 1 to 30% by weight based on the rubber, and the phenolic component of said novolak resin being selected from the group consisting of phenol, bisphenols, alkylphenols and, a combination of alkylphenols with phenol having a content of at most 70 mol % of alkyl phenol, and the rubber being derived from components free of carbonyl groups.

2. A process as claimed in claim 1 wherein the vulcanisation is performed in the presence of a melamine resin the methylol groups of which are at least partially etherified with a monohydric alcohol having from 1 to 12 carbon atoms.

3. A process as claimed in claim 1 wherein said melamine resin is present in an amount of from 2 to 50% by weight based on the weight of the novolak resin.

4. A process as claimed in claim 1 wherein the vulcanisation is performed in the presence of at least one compound selected from the group consisting of mono- or di- carboxylic organic acids having 2 to 20 carbon atoms and polyesters having an acid number of at least 20.

5. A process as claimed in claim 4, wherein the amount of the organic acid component is between 0.1 and 5% by weight, based on the weight of the rubber.

6. A process as claimed in claim 1, which comprises vulcanisation of a rubber composition into which the novolak and the melamine resin have been incorporated at a temperature between 80° and 120° C.

7. A process as claimed in claim 1, which comprises vulcanisation of a rubber composition containing at least one phenol novolak selected from the group consisting of phenol-p-tert.-butylphenol novolaks, phenol-octylphenol novolaks, phenol-nonylphenol novolaks and novolaks prepared from phenol and cashew nut shell oil.

8. A process as claimed in claim 1, which comprises vulcanisation of a composition wherein the amount of novolak is between 3 to 20% by weight, based on the weight of the rubber.

9. An industrial rubber article prepared from a product obtained according to the process claimed in claim 1.

10. A rubber article as claimed in claim 9 in the form of a tire for motor vehicles.

* * * * *